United States Patent [19]

Thompson

[11] 3,782,274
[45] Jan. 1, 1974

[54] APPARATUS FOR CONTINUOUSLY PRODUCING BLOCKS FROM SCRAP METAL

[76] Inventor: Wallace M. Thompson, R.F.D. No. 3, Cordele, Ga. 31015

[22] Filed: Mar. 17, 1972

[21] Appl. No.: 235,719

[52] U.S. Cl............ 100/95, 100/218, 100/232, 100/DIG. 1
[51] Int. Cl............................................. B30b 15/08
[58] Field of Search............ 100/95, 218, 232, 100/39, DIG. 1

[56] References Cited
UNITED STATES PATENTS

| | | | |
|---|---|---|---|
| 3,180,249 | 4/1965 | Patros | 100/95 X |
| 3,563,163 | 2/1971 | Schonauer | 100/95 |
| 2,932,247 | 4/1960 | Thompson | 100/95 |
| 3,610,138 | 10/1971 | Galter | 100/95 X |
| 3,283,697 | 11/1966 | Findlay | 100/95 |

*Primary Examiner*—Billy J. Wilhite
*Attorney*—John W. Malley et al.

[57] ABSTRACT

An apparatus for continuously producing blocks from scrap metal including a compression box which squeezes scrap metal loaded therein into an elongated charge and which includes a ram means for pushing this charge into an axially aligned feeding section. In the feeding section, a plate slidably mounted upon a carriage is vertically lowered behind the rear end of the charge and the charge is driven out the discharge end of the feeding section into the path of a reciprocating shearing blade by a second ram which engages the carriage. The compression box may be reloaded while the feeding and shearing operations take place whereby a continuous process is possible.

12 Claims, 5 Drawing Figures

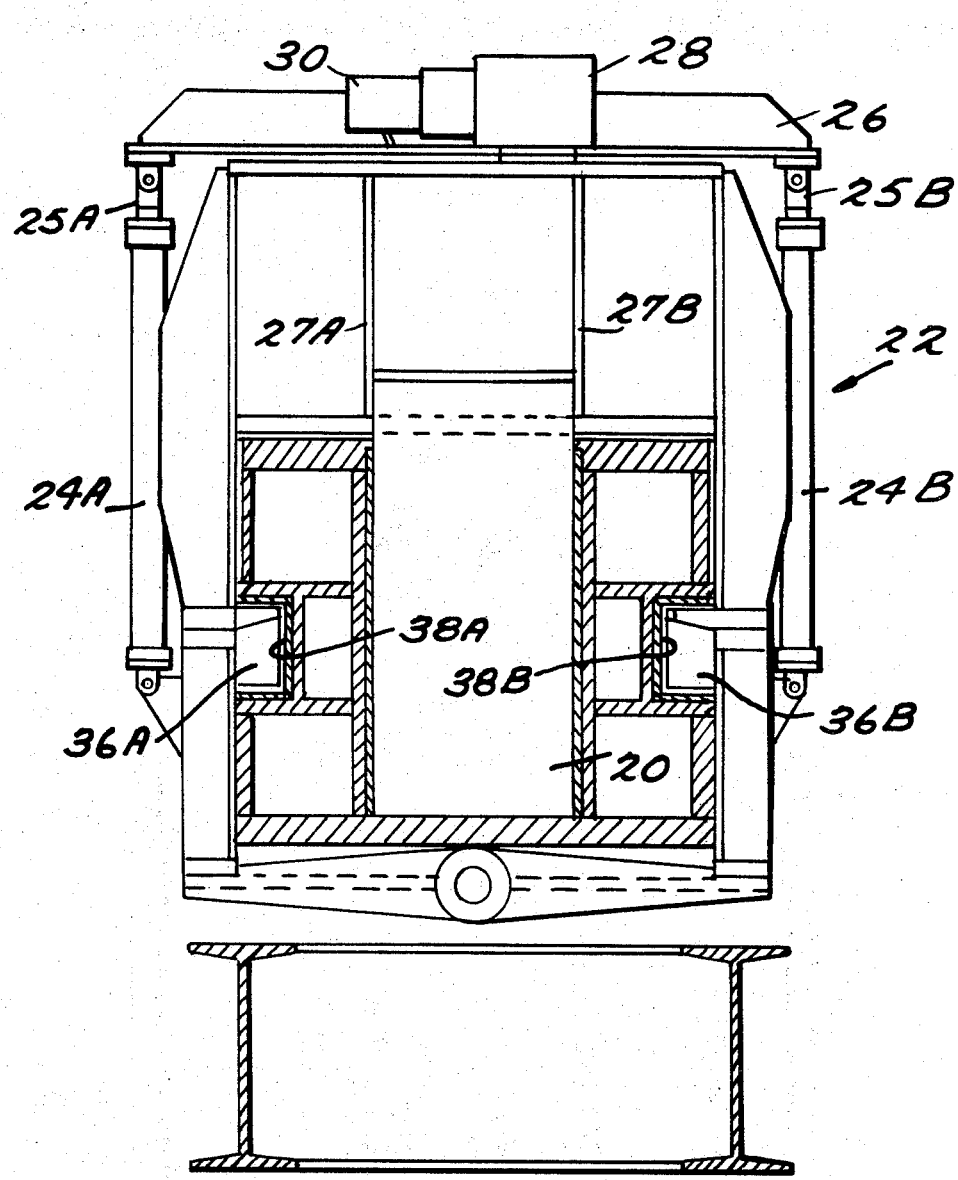

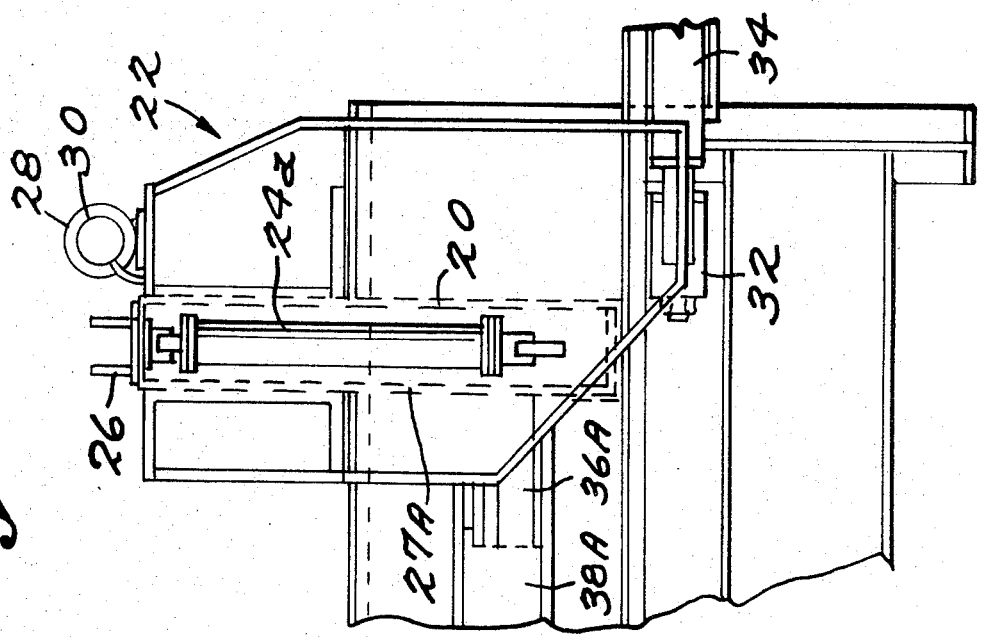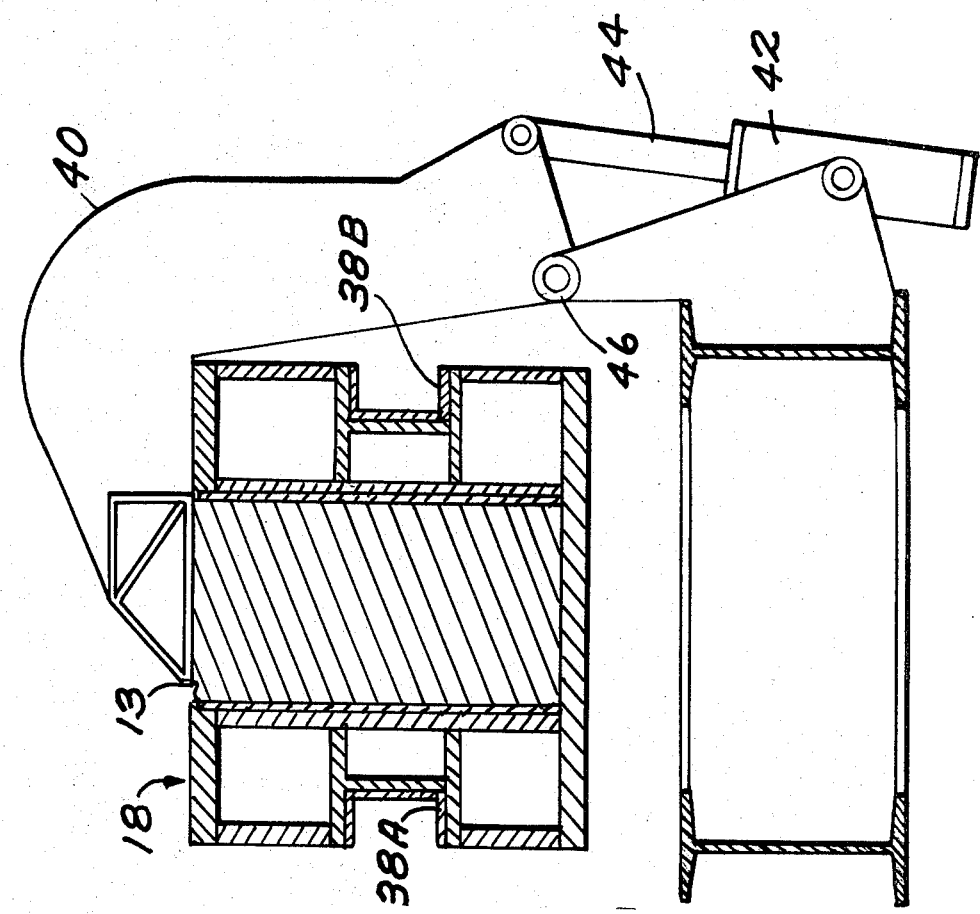

APPARATUS FOR CONTINUOUSLY PRODUCING BLOCKS FROM SCRAP METAL

BACKGROUND OF THE INVENTION

1. Field of the Invention

This invention relates to machines for operating on scrap metal and, more particularly, to machines or groups of machines which transform discarded automobile bodies or like scrap metal into blocks of compressed metal suitable for subsequent processing.

2. Description of the Prior Art

Methods and apparatus for reducing automobiles or the like to compact, easily handed segments of compressed material are well known.

In one process the automobile is compressed to a plate section in a vertically operating hydraulic press which plate is then passed via a conveyor to a stripping section wherein the plate is segmented into elongated strips. Each of these strips is then sheared into blocks or segments suitable for subsequent operations. Such a process is subject to several inherent disabilities. First of all, a potential bottleneck occurs at the segmenting and shearing stages since the segmenting stage creates $n$ number of segments each one of which must be individually and sequentially exposed to shearing.

Secondly, such a system as that described above would not work well in conjunction with the highly efficient type of charging box for metal scrap which is disclosed in the U.S. Pat. No. Re 25,268 to Thompson issued on October 23, 1962 since the Thompson device produces an elongated compacted mass of approximately square cross section rather than a plate.

The Thompson device has the drawback that it cannot be operated continuously, i.e., the compression box cannot be reloaded while a hydraulic ram forces the elongated compacted mass through a shearing unit mounted at one end of the compression box. Furthermore, to insert a conveyor as taught in the above described system between the compression box and shearing device unit of Thompson would not produce a workable device since a great force is needed to ram the elongated mass through the shearing unit and the frictional forces between the conveyor belt and the elongated mass could not alone produce such a force.

SUMMARY OF THE INVENTION

In order to overcome the disadvantages of the prior art described above and, more specifically, in order to adapt the Thompson device for continuous operation, the present invention provides a feeding box between the compression box and the shearing unit each of which may be similar to those units as described in the above identified patent which is incorporated by reference herein.

The feed box comprises a channel defined by a bottom and opposed side walls which is approximately equal in cross sectional shape and size to the shape and size of the compression box in its closed condition. The feed box channel and that of the compression box are in axial alignment so that elongated masses ejected from the compression box pass directly into the feed box. The feed box also includes a hydraulic ram which moves a carriage axially along the feed box. A heavy plate is mounted in vertical slots on the carriage for movement from an up position above the feed box channel to a down position completely blocking that channel and means are provided for raising and lowering said plate. The feed box has a longer axial dimension than the compression box and a longer axial dimension from the plate to the shearing unit so that the elongated masses may be ejected from the compression box into a position between the plate and the shearing unit. Thus, it is possible to raise said plate when an elongated mass is being ejected into the feed box, then lower the plate and use the ram to force the mass through a shearing unit mounted adjacent the opposite end of the feed box channel. A continuous operation for the unit as a whole is ensured because the compression box can be reloaded during the shearing operation.

BRIEF DESCRIPTION OF THE DRAWINGS

The preferred embodiment of the invention will now be described with reference to the following drawings in which:

FIG. 3 is a cross sectional view taken along line 3—3 in FIG. 1;

FIG. 4 is a cross sectional view taken along line 4—4 in FIG. 1; and

FIG. 5 is a detailed view of a portion of the apparatus shown in FIG. 1.

The same elements are designated by the same reference numeral throughout.

DETAILED DESCRIPTION OF THE PREFERRED EMBODIMENT

Figure 1:
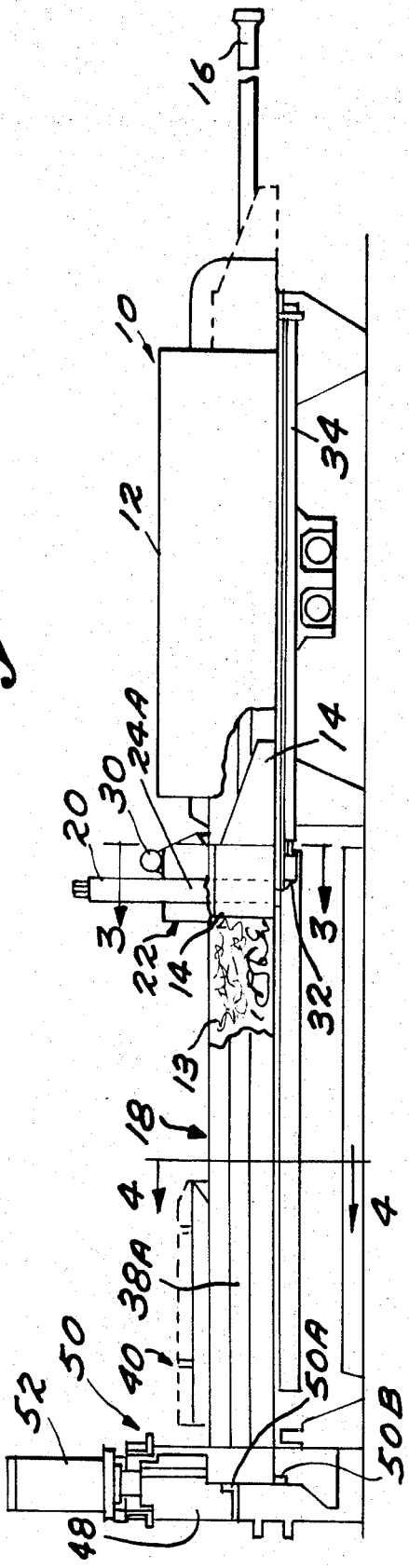
FIG. 1 is a partially schematic side view of an apparatus in accordance with the applicant's invention.

Referring to the drawings, reference numeral 10 designates generally the preferred embodiment of an apparatus for continuously producing blocks from scrap metal. Proceeding from the input to the output sides of apparatus 10, the first portion encountered is compression box 12 which receives the scrap metal in non-compacted form and changes this metal through compression into a compacted mass or slug 13 having peripheral dimensions no greater than the internal dimensions of box 12.

While the box 12 may assume various forms, one suitable embodiment is that shown in the United States patent cited above and incorporated by reference herein. Once loose scrap material has been compressed in box 12, it is forced from this box by a gatherer ram 14 which may be operated by a gatherer ram cylinder 16.

The gatherer ram 14 moves, under the influence of cylinder 16, from the position shown in dotted lines in FIG. 1 to the position shown in full lines therein. This action moves the slug 13 of compressed metal into the feed box 18 of the apparatus which is in axial alignment with the interior 15 of compression box 12 and which has a substantially identical internal cross sectional shape and size. The feed box 18 also has an axial length from the full line position of ram 14 to the shearing unit which is longer than the length of compression 12 so that the slug 13 formed in the compression box 12 may be adequately received within this portion of feed box 18. The gatherer ram's full line position is just beyond the door portion 20 of the feed ram carriage 22. The door portion 20 is mounted for sliding vertical movement in feed ram carriage 22 and is powered by motor 28, pump 30 and cylinders 24A and 24B to be lifted to the position shown in full lines in FIG. 1 so that slug 13 and ram 14 may pass the position of feed ram carriage 22. See also in this regard FIGS. 3 and 5 which show the feed ram carriage 22 in end and side views, respectively.

From these views it is clear that cylinders 24A and 24B are secured to carriage 22 and the pistons of the cylinders are secured to the brace 26 which is secured as by welding to the top edge of door 20 so that door 20 is extended upward along guiding tracks 27A and 27B formed in carriage 22 when the cylinders 24A and 24B are activated by fluid supplied from pump 30 under the action of motor 28.

Figure 2:
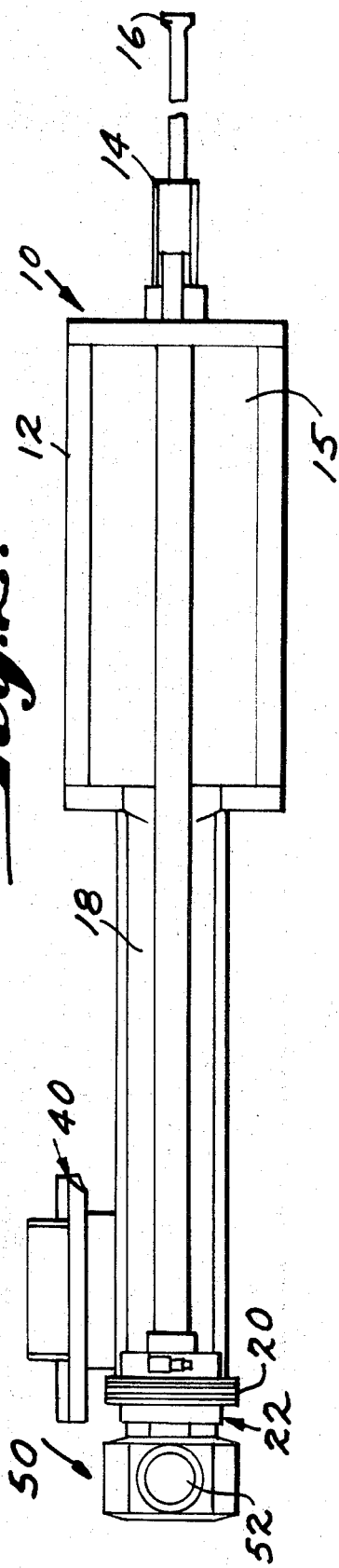
FIG. 2 is a top view of the apparatus shown in FIG. 1 but with the feed ram carriage shown in a different position.

After the slug 13 has been forced to the position shown in FIG. 1 and the gatherer ram 14 is retracted to the solid line position shown in FIG. 2, the door 20 is lowered and the feed ram carriage 22 is forced to the left by feed ram 32 which is, in turn, operated by feed ram cylinder 34. The feed ram carriage is guided in this travel by lugs 36A and 36B which are received within slots 38A and 38B, respectively, formed along opposed outer surfaces of feed box 22 as is best seen in FIG. 3. As the feed ram carriage approaches the lid assembly 40, which is best seen in FIG. 4, the lid cylinder 42 causes lid ram 44 to pivot assembly 40 about pivot shaft 46 away from the position shown in FIG. 4 to that shown in FIG. 2 so that there is no interference between the lid assembly 40 and the feed ram carriage 22. It is noted that the purpose of lid assembly 40 is to apply a downward pressure to the top of slug 13 so as to depress any upward facing projections therein which may be left by compression box 12 or which may be forced upwards during feeding of slug 13, before the slug is sheared into blocks. It is noted that while a single lid assembly has been shown it is also possible to use opposed lids which are pivotally mounted to opposite sides of feed box 18 and which together enclose the upper surface of the feed box.

As the feed ram carriage 22 moves to the left, as shown in FIGS. 1 and 2 to force the slug 13 into the shear assembly, its movements are coordinated with the vertical reciprocation of cross head 48 of shear assembly 50 which operates, under the force of hydraulic cylinder 52 to sequentially shear fixed lengths of slug 13 into blocks 54, (not shown). The reciprocating blade of the shear assembly is shown at 50A, and the fixed blade is shown at 50B in FIG. 1.

Before the invention of the above described apparatus, it was necessary to perform each of the following process steps in sequence to complete a single operative cycle: Charging scrap metal into the compression box, compressing the charged scrap into a slug, forcing the charged scrap with a feed ram past a reciprocating shearing device to shear a plurality of blocks therefrom, retracting the ram and recharging and compressing a new charge of scrap. The above described device, on the other hand, permits simultaneous shearing and charging and compressing in cycles subsequent to start up whereby process time savings in the range of 47 to 75 percent may be achieved dependent upon the time taken up by individual process steps.

For example, in the applicant's device, during startup, scrap metal is first fed to compression box 12 and then compressed therein to closed box dimensions. The slug 13 formed thereby is then forced beyond the feed ram carriage 22 by the gatherer ram which then retracts to its initial position. The door 20 of the feed ram carriage 22 then descends and, under the influence of feed ram 32, the slug 13 is forced beneath the trimming lid 40 to the throat of the shearing device 50, the lid 40 being lifted by piston 44 as the feed ram carriage 22 approaches within 3 feet thereof. The feed ram carriage 22 then is automatically coordinated with the shearing device 50 by known means to feed the slug 13 to the shearing device 50 in measured amounts as the shearing blade 50A is vertically reciprocated whereby a plurality of blocks 54 are formed. Upon completion of its feeding stroke the door 20 of the feed ram carriage is lifted and the carriage then returns to its initial position.

In cycles subsequent to start up the charging of scrap, compression in box 12, the ejection of the slug 13 into the feed box to a position beyond the initial position of feed ram carriage 22 is accomplished simultaneously with the feeding and shearing of slug 13 and the return of feed ram carriage 22 to its initial position whereby a great savings in operating time is achieved.

While the above description fully covers the preferred embodiment of the invention, many modifications may be made to the specific apparatus described within the scope of the invention.

Thus, to ascertain the true scope of the invention, reference should be made to the following claims.

What is claimed is:

1. Apparatus for continuously producing compressed blocks from scrap metal comprising a compression portion including compression means for producing an elongated charge of compressed scrap metal and means for ejecting said charge from said compression portion, a feeding portion in communication with said compression portion for receiving the charge from said compression portion and including means for steadily feeding said charge, said feeding portion including a boxlike receptacle having a bottom wall and wall means fixedly secured to opposite sides of said bottom wall defining a first open end axially aligned with, and having substantially the same size as, the open end of said compression portion whereby compressed scrap ejected from said compression portion passes into said feeding portion and said receptacle further having a second open end substantially identical in size and shape to said first open end disposed at the opposite end of said feeding portion, and a shearing portion disposed adjacent and in communication with said second opend end of said feeding portion for receiving the charge from the feeding portion and shearing same into a plurality of blocks.

2. Apparatus as recited in claim 1 wherein said means for steadily feeding said charge comprises a rigid plate member which is mounted in a plate mounting member which includes lift means for producing vertical movement of said plate member in a plane perpendicular to said wall means of said feeding portion from a lowered position which completely closes the opening defined by said wall means and bottom wall to a raised position disposed above said wall means, said apparatus further including a drive means for sliding said plate mounting member along said receptacle from a first position adjacent said compression portion to a second position adjacent said shearing portion whereby said plate member may be disposed in said raised position to receive said charge from said compression portion and in said lowered position for steadily feeding said charge when said drive means causes said plate mounting member to slide along said receptacle.

3. Apparatus as recited in claim 2 wherein said plate mounting member further comprises a carriage mounted for movement adjacent and parallel to the longitudinal axis of said feeding portion, and means for moving said carriage.

4. Apparatus as recited in claim 3 wherein the portions of said wall means of said feeding portion opposite said bottom wall each include an axially aligned slot and said carriage includes lugs which engage said slots whereby said carriage is mounted for movement.

5. Apparatus as recited in claim 3 wherein said means for moving said carriage comprises a reciprocating fluid motor.

6. Apparatus as recited in claim 2 wherein said lift means comprises at least one cylinder mounted to said carriage and including a piston fixedly attached to said plate member, a hydraulic lift system, an electrical motor and pump driven by said electrical motor both being mounted upon said pump for generating flow through said hydraulic lift system to extend said piston from said cylinder and electrical operators for controlling said motor.

7. Apparatus as recited in claim 1 further including a lid means pivotally mounted adjacent said feeding portion for movement from an open position to a closed position in which said open top of said feeding portion is at least substantially closed in the area adjacent said shearing portion and means for moving said lid means from said open to said closed and said closed to said open position.

8. Apparatus as recited in claim 7 wherein said moving means comprises a hydraulic cylinder securely fixed adjacent said feeding portion and a piston movably disposed within said cylinder and fixed at one end to said lid means.

9. Apparatus as recited in claim 1 wherein said shearing portion comprises a shear blade mounted for vertical movement across said second open end of said feeding portion to shear said compressed change into blocks.

10. Apparatus for continuously producing compressed blocks for scrap metal comprising: a horizontally elongated compression box for compressing a charge of scrap metal into an elongated compacted mass; a horizontally elongated open-ended shear feed box disposed adjacent one end of said compression box on the longitudinal axis of said compression box for receiving a compacted mass of scrap metal from said compression box; an ejection ram for engaging the end of a compacted mass of scrap metal in said compression box and for ejecting the mass from said compression box into said feed box; shearing means disposed adjacent the end of said feed box remote from said compression box for shearing a compacted mass of scrap metal into a plurality of blocks; and means for engaging the end of the compacted mass of scrap metal remote from said shearing means and for moving the mass through said feed box toward said shearing means.

11. Apparatus as in claim 10 wherein said means for engaging the end of a compacted mass of scrap metal and moving the mass toward said shearing means includes a vertically disposed door which is slidable between positions in which it opens and closes the end of said feed box adjacent said compression box, and wherein said ejection ram has a stroke sufficient to push a compacted mass of scrap metal past said door when the latter is in its open position.

12. Apparatus as in claim 10 wherein said door is supported on a carriage which is mounted for reciprocating movement along the length of said feed box.

* * * * *